Patented Jan. 1, 1946

2,392,248

UNITED STATES PATENT OFFICE 2,392,248

HYDROCARBON CONVERSION

Edwin T. Layng, Jersey City, and Seymore Goldwasser, East Orange, N. J., assignors to The M. W. Kellogg Company, Jersey City, N. J., a corporation of Delaware No Drawing. Application August 8, 1942,
Serial No. 454,182

14 Claims. (Cl. 260—673.5)

This invention relates to improvements in hydrocarbon conversion processes utilizing catalyst compositions comprising a minor proportion of a catalytically active material in combination with a major proportion of an alumina carrier. More particularly, the invention relates to improvements in hydrocarbon conversion processes utilizing catalyst compositions comprising a major proportion of an alumina carrier in combination with a minor proportion of an activating oxide, such as an oxide of a metal of the left-hand column of group VI of the periodic table, including chromium, molybdenum and tungsten. More particularly, the invention relates to improvements in hydrocarbon conversion processes such as hydrogenation, dehydrogenation, reforming and aromatization by means of a catalyst composition comprising a major proportion of a carrier material comprising dehydrated alumina gel in combination with a minor proportion of an activating oxide such as chromium oxide or molybdenum oxide. The invention also relates to an improved catalyst comprising a minor proportion of one or more of the catalytically active materials in combination with a major proportion of a carrier, comprising dehydrated alumina gel, and an activating and stabilizing ingredient comprising alumina in the form of the residue of a calcined aluminum salt.

The improved catalyst composition employed in the improved hydrocarbon conversion process comprises a major proportion of dehydrated alumina gel, a minor proportion of an activating oxide, such as molybdenum oxide and chromium oxide, and a minor proportion of an activating and stabilizing ingredient comprising alumina in the form of a residue of a thermally decomposed aluminum salt.

The catalyst is prepared preferably in an order of steps which involves first combining the alumina gel and the activating oxide, or a compound which is thermally converted to the activating oxide, and then adding to the composition a salt of aluminum which can be converted to alumina by thermal decomposition.

The alumina gel may be combined with the activating oxide, or a suitable source material therefor, before or after dehydration of the gel. Preferably, however, the alumina gel is first dehydrated and then combined with a solution of a compound of the metal corresponding to the desired activating oxide. These materials may be combined by impregnating the dehydrated alumina with a solution of the metal compound in such concentrations and amounts as to absorb in the alumina gel a quantity of the solution containing the desired amount of the metal compound. Alternatively, the dehydrated alumina gel may be formed into a paste with a solution containing an appropriate amount of the metal compound after which the paste may be dried.

The alumina gel may be prepared by peptizing aluminum hydrate with acid or by precipitating the gel from an aluminum salt solution with ammonia. After filtration and washing the alumina gel which is obtained is substantially dehydrated by heating it at temperatures which are sufficiently moderate to retain the characteristic structure of a dried alumina gel. Final temperatures in the range of 600° to 1400° F. may be employed ordinarily although heating for relatively long periods at temperatures in the lower portion of this range is to be preferred.

After combining the dehydrated alumina gel and the compound capable of decomposition to the activating oxide in the manner described above it is preferred ordinarily to treat the composition thus obtained to convert the metal compound to the activating oxide. This step is desirable since it is preferred to combine the aluminum salt with the composition as an aqueous solution. The aluminum salt may be combined by immersion of the previously formed composition in a solution of the aluminum salt, or a suitable quantity of a solution of the aluminum salt may be combined directly with the composition.

For combining the activating oxide with the dehydrated alumina gel any soluble compound of the corresponding metal may be employed which is susceptible to thermal decomposition to the oxide. For example, a solution of chromium trioxide or of ammonium dichromate may be employed for incorporating chromium oxide in the composition. Ammonium molybdate is a convenient source of molybdenum trioxide. Likewise, any suitable aluminum salt may be employed such as the nitrate, the acetate, the chloride or the sulfate.

The quantity of the activating oxide, such as chromium oxide, employed in the improved catalyst composition may be from 1 to 12 weight per cent, although smaller or larger proportions may be employed. The quantity of alumina included in the catalyst composition as the residue of a thermally decomposed aluminum salt may vary from 1 to 10 per cent. For example, a catalyst composition comprising 10 weight per cent of chromium sesquioxide, 3 weight per cent of alumina from the aluminum salt and 87 weight per cent of dehydrated alumina gel is satisfactory.

The invention will be described further by reference to specific examples of the preparation and testing of an improved catalyst of the present invention in comparison with similar catalyst preparations of the character previously suggested. It is to be understood, however, that the following example is referred to only for purposes of illustration and is not intended as limiting the invention to the specific catalyst preparation described or to the use of a particular activating oxide or to the use of particular reagents in the preparation of the catalyst.

*Catalyst A.*—440 grams of chromium trioxide were dissolved in distilled water to form 1500 c. c. of solution. This solution was used to cover 1500 grams of 8 to 14 mesh Activated Alumina. Suction was applied to reduce the pressure on the mixture to 35 mm. after which the vacuum was released. This procedure was repeated twice, in which steps the pressure was reduced to 20 and 10 mm., respectively. During the preparation the mixture of reagents was shaken to facilitate the removal of air from alumina. The unabsorbed solution was drained from the alumina, and the latter was air dried for a few days. The alumina was then heated in a muffle furnace to 1200° F. for one hour. This treatment decomposed the chromium trioxide to chromium sesquioxide. The catalyst thus prepared contained chromium sesquioxide in a ratio thereof to alumina of about 1:9.

*Catalyst B.*—110 grams of alumina made by drying alumina gel at 235° F. for one week and 800° F. for 3 hours were broken up to a granular mass which passed a 4 mesh sieve but was retained on a 40 mesh sieve. This granular mass was mixed with a solution of 16.6 grams of ammonium dichromate in 35 c. c. of water until the coloration of the mass was uniform. This material was then heated at 384° F. for 4 hours to decompose the ammonium dichromate.

*Catalyst C.*—110 grams of alumina made by drying alumina gel at 235° F. for one week and at 800° F. for 3 hours were broken up to a granular mass which passed a 4 mesh sieve but was retained on a 40 mesh sieve. 16.6 grams of ammonium dichromate dissolved in 35 c. c. of water were added to the granular mass thus obtained and the mixture stirred until coloration was uniform. The mass thus obtained was dried in a muffle furnace at 375° F. until decomposed, a period of about 4 hours being required. The resulting material was cooled and moistened with 30 c. c. of water. Then 30 c. c. of water containing 8.0 grams of aluminum nitrate were added, and the mass was shaken until uniform in color. This material was then dried at 482° F. overnight.

The catalysts thus prepared were tested under identical conditions in the dehydrogenation and cyclization treatment of an East Texas heavy naphtha boiling between 247° F. and 396° F. The catalyst was placed in a suitable reaction chamber and maintained at a temperature of 932° F. The heavy naphtha was charged to the reaction zone in the vapor form at the reaction temperature at the rate of 25 c. c. (liquid basis) per hour for each 100 c. c. of catalyst volume. Prior to each operating run the catalyst was contacted with hydrogen for four hours at 932° F. The gas and liquid products of each 2.5 hours of each operating run were separately collected and analyzed. The results of these comparative tests are summarized below in the following table.

|  | Catalyst A | Catalyst B | Catalyst C |
|---|---|---|---|
| Gas production, mols gas/mols feed: |  |  |  |
| 0–2.5 hours | 2.29 | 2.47 | 2.62 |
| 2.5–5 hours | 2.08 | 2.35 | 2.52 |
| 5–7.5 hours | 1.70 | 2.12 | 2.38 |
| 7.5–10 hours | 1.54 |  | 2.16 |
| Average mol percent $H_2$ in gas | 83.6 |  | 85.4 |
| Liquid products, vol percent aromatics: |  |  |  |
| 0–2.5 hours | 53.3 | 52.0 | 56.6 |
| 2.5–5 hours | 46.4 | 48.8 | 55.1 |
| 5–7.5 hours | 42.3 | 44.7 | 52.7 |
| 7.5–10 hours | 38.7 |  | 49.8 |

The results obtained in the tests of catalysts A and C demonstrate that catalyst C, which is the improved catalyst of the present invention, is definitely superior to catalyst A, which was prepared from Activated Alumina and chromium trioxide in the well-known manner. That the difference in the results obtained with catalysts A and C was not due to the difference in the form of alumina employed as a support is shown by a comparison of the results obtained with catalysts B and C. Catalyst B is similar to catalyst C except for the omission of the incorporation of aluminum from aluminum nitrate. As shown by the volume of gas produced in the operations and by the rate of production of aromatic hydrocarbons, catalyst C was definitely superior to both catalysts A and B in the dehydrogenation and cyclization treatment of the naphtha.

In the foregoing specific example of the application of the process for the treatment of heavy naphtha to obtain a product of higher anti-knock value uniform operating conditions were employed to permit a comparison of the results obtained. In the application of the invention to the treatment of naphtha the reaction conditions necessarily must be selected with reference to the character of the hydrocarbons being treated, the results desired and the composition of the catalyst. Treatment of naphtha in the improved process should be carried out at temperatures of 850° F. to 1050° F. Within this temperature range space velocities of 0.1 to 3.0 volumes of liquid per volume of catalyst space per hour may be employed advantageously. If desired hydrogen may be circulated through the reaction zone, and this operation may be carried out on a recycling basis since hydrogen is produced in the process. For example, hydrogen may be recycled in the amount of 3.0 mols of hydrogen per mol of hydrocarbon reactants. Operating pressures varying from atmospheric pressure to 450 pounds per square inch may be employed.

While the invention has been described by reference to specific examples involving the treatment of a specific mixture of hydrocarbons, the invention is also applicable to the treatment of other mixtures of hydrocarbons or individual hydrocarbons. For example, the invention includes the treatment of individual aliphatic hydrocarbons. Aliphatic hydrocarbons having six carbon atoms per molecule may be treated to effect cyclization and armatization thereof. For example, normal heptane may be treated to effect conversion thereof to heptene and toluene. Normally gaseous hydrocarbons also are treated in accordance with the improved process. For example, butane is treated to effect dehydrogenation thereof to butene, or butene is dehydrogenated to butadiene. In addition to the production of simple aromatic hydrocarbons, as by treatment of naphthenic or aliphatic hydrocarbons, the process is applicable to the production of more highly cyclicized hydrocarbons such as naphthalene and anthracene.

While the foregoing specific examples of the improved conversion process involved the use of a fixed bed of granular catalyst, through which the reaction mixture and the regenerating gases were passed alternately, it is evident that the invention is not limited to operations employing the improved catalyst in a static condition. The improved process involves as well the use of the catalyst in granular or powdered form in a moving body. In this method of operation the catalyst mass moves downwardly, either continuously or intermittently, through the reactor as the result of continuous or periodic removal of a portion of the catalyst mass at the bottom of the reactor and corresponding replenishment with fresh or regenerated catalyst at the top of the reactor. In another application of the invention the powdered catalyst is suspended in the stream of reactants and thus passed through the reaction zone with the reactants. In another method of operation the powdered catalyst is maintained as a fluidized, or pseudo-fluid, mass in the reaction zone by the passage of the vaporized reactants upwardly therethrough. Continuous addition and withdrawal of catalyst is effected by suspension of catalyst in the flowing stream of reactants and by direct addition and withdrawal by means independent of the stream of reactants. In all the operations involving the use of catalyst in a non-static condition substantially continuous operation is attained in a single reactor, the withdrawn catalyst being regenerated, or otherwise treated, outside the reactor and returned for further use in the reactor without interrupting the flow of reactants therethrough.

We claim:

1. A hydrocarbon conversion process which comprises contacting a hydrocarbon at elevated temperature with a catalyst comprising a major proportion of a dehydrated alumina gel carrier in combination with a minor proportion of an activating oxide of a metal of the left-hand column of group VI of the periodic table and a minor proportion of alumina deposited on the catalyst as the residue of a thermally decomposed aluminum salt.

2. A hydrocarbon conversion process which comprises contacting a hydrocarbon at elevated temperature with a catalyst prepared by depositing a compound of aluminum on the surface of a catalyst composition comprising a major proportion of a dehydrated alumina gel carrier and a minor proportion of an oxide of molybdenum, and converting said deposited aluminum compound to alumina.

3. A hydrocarbon conversion process which comprises contacting a hydrocarbon at elevated temperature with a catalyst prepared by depositing a compound of aluminum on the surface of a catalyst composition comprising a major proportion of a dehydrated alumina gel carrier and a minor proportion of an oxide of chromium, and converting said deposited aluminum compound to alumina.

4. A hydrocarbon conversion process which comprises contacting a hydrocarbon at elevated temperature with a catalyst prepared by depositing a compound of aluminum on the surfaces of a catalyst composition comprising a major proportion of a dehydrated alumina gel carrier and a minor proportion of an activating oxide of a metal of the left-hand column of group VI of the periodic table, and converting the said deposited aluminum compound to alumina.

5. A hydrocarbon conversion process which comprises contacting a hydrocarbon at elevated temperature with a catalyst prepared by depositing a thermally decomposable salt of aluminum on the surfaces of a catalyst composition comprising a major proportion of a dehydrated alumina gel carrier and a minor proportion of chromium sesquioxide, and heating the composition thus prepared to convert the said deposited aluminum salt to alumina.

6. A process for dehydrogenating a hydrocarbon which comprises contacting a hydrocarbon at elevated temperature with a catalyst comprising a major proportion of a dehydrated alumina gel carrier in combination with a minor proportion of an activating oxide of a metal of the left-hand column of group VI of the periodic table and a minor proportion of alumina deposited on the catalyst surface as the residue of a thermally decomposed aluminum salt.

7. A process for dehydrogenating a hydrocarbon which comprises contacting a hydrocarbon at elevated temperature with a catalyst comprising a major proportion of a dehydrated alumina gel carrier in combination with a minor proportion of a chromium sesquioxide and a minor proportion of alumina deposited on the catalyst surface as the residue of a thermally decomposed aluminum salt.

8. A process for the production of aromatic hydrocarbons from aliphatic hydrocarbons having at least six carbon atoms per molecule which comprises contacting said aliphatic hydrocarbons at elevated temperature with a catalyst comprising a major proportion of a dehydrated alumina gel carrier in combination with a minor proportion of an activating oxide of a metal of the left-hand column of group VI of the periodic table and a minor proportion of alumina deposited on the catalyst surface as the residue of a thermally decomposed aluminum salt.

9. A process for treating a hydrocarbon fraction boiling at least partly within the gasoline boiling range to effect conversion thereof to gasoline constituents of high anti-knock value which comprises contacting said fraction at elevated temperature with a catalyst comprising a major proportion of a dehydrated alumina gel carrier in combination with a minor proportion of an activating oxide of a metal of the left-hand column of group VI of the periodic table and a minor proportion of alumina deposited on the catalyst surface as the residue of a thermally decomposed aluminum salt.

10. The method of conditioning dehydrogenation and hydrocarbon reforming catalysts comprising a major proportion of an alumina carrier in combination with a minor proportion of a compound of a group VI metal which comprises treating said catalysts with a water soluble aluminum compound decomposable into alumina on heating, drying and heating to a temperature sufficiently high to decompose said aluminum compound to alumina, whereby there is deposited on the catalyst surface a coating comprising alumina.

11. In a catalyst hydrocarbon reforming process the method which comprises treating a hydrocarbon reforming catalyst comprising a major proportion of an alumina carrier in combination with a minor proportion of a compound of a group VI metal with a solution of an aluminum compound decomposable into alumina on heating subsequent to the preparation of said catalyst, heating the treated catalyst to a temperature sufficiently high to decompose said aluminum compound to form an alumina coating on said catalyst surface, and treating a hydrocarbon oil with said coated catalyst at a temperature of about 850 to 1025° F.

12. In processes employing dehydrogenation and hydrocarbon reforming catalysts comprising a major proportion of an alumina carrier in combination with a minor proportion of a compound of a group VI metal the method which comprises treating said catalysts with a solution of an aluminum compound decomposable into alumina on heating, heating the treated catalyst to a temperature sufficiently high to decompose said aluminum compound prior to using said catalyst for hydrocarbon conversion whereby an alumina coating is formed on said catalyst surface, and treating a hydrocarbon oil with said coated catalyst at a temperature of about 850 to 1025° F.

13. A hydrocarbon conversion process which comprises contacting a hydrocarbon at elevated temperature with a catalyst prepared by depositing a thermally decomposable salt of aluminum on the surfaces of a catalyst composition comprising a major proportion of a dehydrated alumina carrier and a minor proportion of chromium sesquioxide, and heating the composition thus prepared to convert the said deposited aluminum salt to alumina.

14. A process for treating a hydrocarbon fraction boiling at least partly within the gasoline boiling range to effect conversion thereof to gasoline constituents of high anti-knock value which comprises contacting said fraction at elevated temperature with a catalyst comprising a major proportion of a dehydrated alumina carrier in combination with a minor proportion of an activating oxide of a metal of the left-hand column of group VI of the periodic table and a minor proportion of alumina deposited on the catalyst surface as the residue of a thermally decomposed aluminum salt.

EDWIN T. LAYNG.
SEYMORE GOLDWASSER.